UNITED STATES PATENT OFFICE.

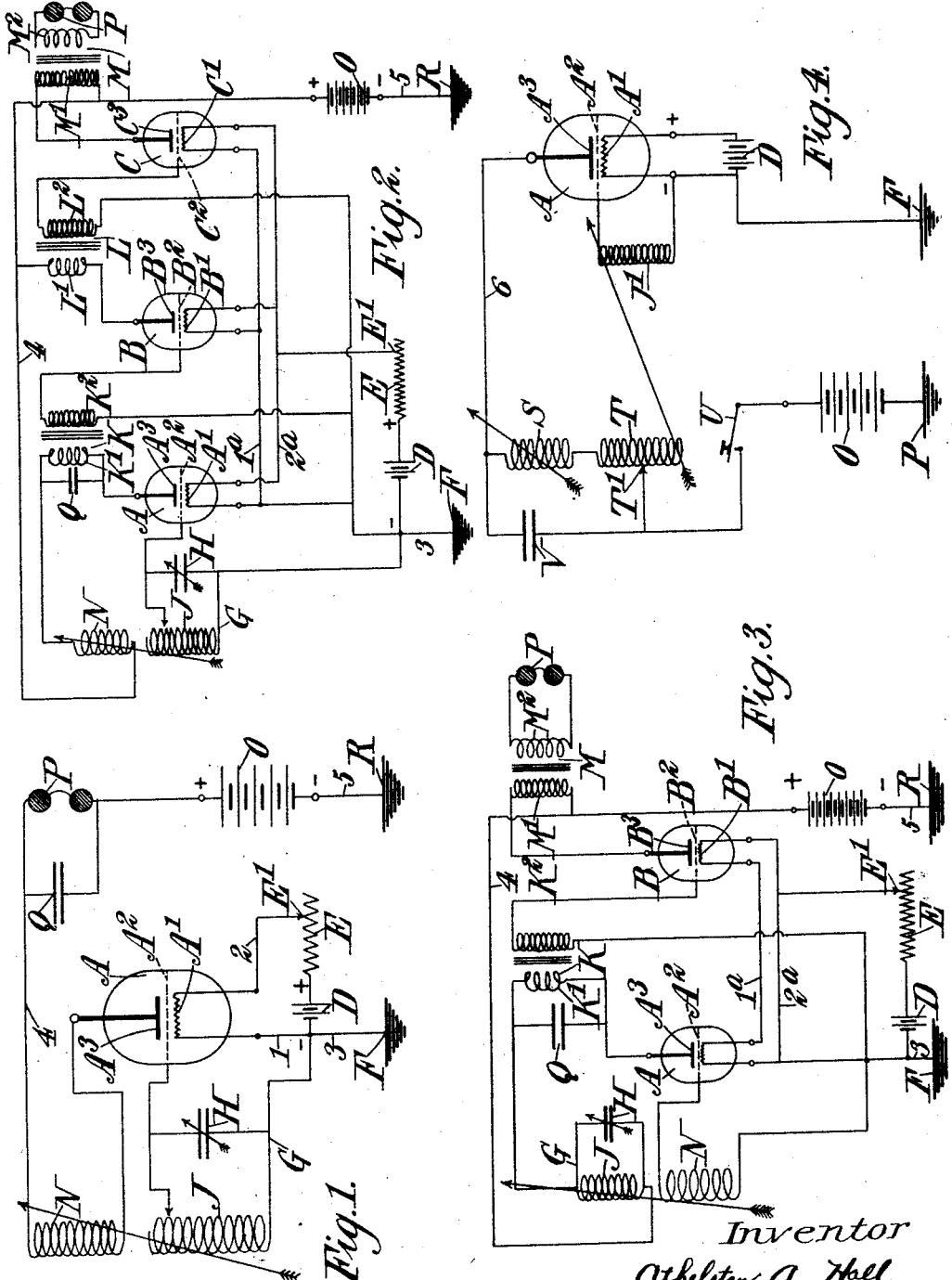

ATHELSTAN ARGYLE HALL, OF LONDON, ENGLAND.

WIRELESS SIGNALING APPARATUS.

1,384,523. Specification of Letters Patent. Patented July 12, 1921.

Application filed November 1, 1919. Serial No. 335,072.

*To all whom it may concern:*

Be it known that I, ATHELSTAN ARGYLE HALL, a subject of the King of England, residing at London, England, have invented certain new and useful Improvements in Wireless Signaling Apparatus, of which the following is a specification.

This invention relates to apparatus for wireless telegraphic and telephonic signals, and has for its object to provide arrangements of circuits whereby such signals can be received and transmitted without employing the usual aerials at the receiving and sending stations.

According to this invention wireless signaling apparatus comprising an oscillation valve is characterized by the grid of the valve being connected directly or inductively to an oscillatory circuit, for example a tunable circuit, and by the plate being connected to the cathode through two earth connections and a signal sending or receiving device, for example a telephonic receiving device.

Conveniently, the circuit containing the plate is inductively coupled to the grid circuit.

Other features of the invention are described hereinafter.

One embodiment of the invention and modifications thereof are diagrammatically represented by way of example in the accompanying drawing, wherein:—

Figure 1 is a diagram showing one form of receiving apparatus according to the invention comprising only one oscillation valve having its grid connected inductively to an oscillatory circuit.

Fig. 2 is a diagram showing a modified form of receiving apparatus comprising three oscillation valves, and Fig. 3 is a diagram showing another modification of receiving apparatus comprising two valves having their grids connected inductively to oscillatory circuits;

Fig. 4 is a diagram showing one form of transmitting apparatus according to the invention.

Like reference letters designate like parts in all the diagrams.

Referring first to Fig. 1, a thermionic valve A has one terminal of its filament $A^1$ connected by a conductor 1 to the negative pole of a battery D, hereinafter called the filament battery, and its other terminal connected by a conductor 2 and a movable contact-piece $E^1$ to a variable resistance E connected to the positive pole of the filament battery. The negative pole of this battery is connected to one end of an insulated conductor 3, which lies on the ground and whereof the other end is earthed at F by an earth connection.

The valve A has its grid $A^2$ connected to the negative terminal of the filament battery by way of an oscillation circuit G comprising a variable condenser H and an adjustable inductance J.

A second oscillatory circuit containing the plate $A^3$ of the valve A is inductively connected to the grid $A^2$ by means of a reactance N which is variably coupled with the inductance J and has one terminal connected to the plate A. The other terminal of the reactance N is connected by a conductor 4 to the positive terminal of a high-tension battery O, hereinafter called the signaling battery, by way of two telephone receivers P connected in series therewith; a small condenser Q is provided across these receivers. An insulated wire 5 is connected at one end to the negative terminal of the signaling battery O and extending any convenient distance, is laid along upon the ground and is earthed at its other end at R by means of an earth connection. It will be seen from the above that the plate $A^3$ of the valve A is connected to the cathode $A^1$ through two earth connections F and R and through a telephonic receiving device P. The instruments may stand on the ground or be beneath it, as in a dug-out. No vertical portion is needed for the conductors 3 and 5.

Referring now to Fig. 2, three thermionic valves A, B and C, have their filaments $A^1$, $B^1$ and $C^1$ all connected in parallel to two conductors $1^a$, $2^a$, whereof the former conductor is connected to the negative terminal of the filament battery D, while the latter is connected to the movable contact-piece $E^1$ of the resistance E. The negative terminal of the filament battery is earthed at F, and the grid $A^2$ is connected to the oscillatory circuit G as described above with reference to Fig. 1.

In this arrangement three iron-cored transformers K, L, M comprising each a primary winding $K^1$, $L^1$, $M^1$, respectively, and a secondary winding $K^2$, $L^2$, $M^2$ respectively, are connected in circuit as follows:—The primary winding K of the step-up transformer K has one terminal connected through the reaction coil N and through the conductor 4 to the positive terminal of the signaling battery O, while its other terminal is connected to the plate A³ of the valve A, the condenser Q being provided across the terminals of this winding K¹. The secondary winding K² has one terminal connected to the negative terminal of the filament battery D, and its other terminal connected to the grid B² of the valve B. This valve has its plate B³ connected through the primary winding L¹ of the step-up transformer L to the conductor 4; the secondary winding L² has one terminal connected to the negative terminal of the filament battery D and its other terminal connected to the grid C² of the valve C. This valve has its plate C³ connected through the primary winding M¹ of the step-down transformer M to the conductor 4, and the secondary winding M² has the pair of telephone receivers P connected in series across its terminals. It will be observed that the three valves A, B and C are arranged in cascade.

Referring now to Fig. 3, this apparatus is arranged similarly to that described above with reference to Fig. 2 but differs therefrom in the connection of the grid A² with the tunable oscillatory circuit. In this arrangement the grid A² is connected by way of the reactance N with the negative terminal of the filament battery D, and the tunable oscillatory circuit G comprising the variable condenser H and the inductance J is connected in the second oscillatory circuit comprising the plate A³, the signaling battery O and the receiving means comprising the telephone receivers P.

It will be observed that this oscillatory circuit is earthed at F and R, as described above with reference to Figs. 1 and 2, and that the tunable oscillatory circuit G is inductively connected to the grid A².

It will be seen that if the reactance between the coils N and J in all the arrangements described above is suitably adjusted, the oscillation valve or valves will oscillate continuously, and it has been found by experiment that signals can be received with the described apparatus from transmitting stations at a distance of several hundred miles when continuous waves or sparks are employed and particularly when the described earth connections F and R are situated a considerable distance apart. Good results have been obtained with the earth connections up to half a mile apart.

The transmission of signals can be effected by transmitting apparatus according to the invention when the parts of the apparatus described above used for receiving are replaced by corresponding transmitting apparatus and when the described plate circuit has its earth connections situated at a moderate distance apart.

Referring to Fig. 4 the grid A² of the valve A is connected through an inductance J¹ to the negative terminal of the filament A¹, which terminal is connected to the negative terminal of the battery D and is earthed at F as described above with reference to the receiving apparatus. The plate A³ of the valve is connected by a conductor 6 to a variometer S which is connected to a variable inductance T. The movable contact-piece T¹ of this inductance is connected through a signaling key U to the positive terminal of the signaling battery O which is earthed at P. A condenser V is shunted across the inductances S and T. It will be seen that the coupling between the inductances T and J¹ can be varied to aid tuning.

In each of the connections described above with reference to Figs. 1–4, the portions of the earth situated between the two earth connections in the plate-filament circuits constitutes the radiation element of the system.

If more than one valve is used in transmitting apparatus, their grids and plates will be connected in a manner analogous to that described above with reference to Fig. 2.

If desired the connections of Fig. 4 may be modified by substituting a direct wire connection between the batteries O and D, in place of that by the earths P and F, and by substituting for the wire between the condenser V and the tapping T¹, a connection formed by two earths.

It will be appreciated that various modifications may be made without departing from the invention as defined in the claims. For example, instead of using telephone receivers P some other convenient forms of signal-sending and receiving devices may be employed.

What I claim as my invention and desire to secure by Letters Patent is:—

1. Wireless signaling system comprising in combination, an oscillation valve, a source of current connected to the cathode for heating the same, an oscillatory circuit connecting the grid with the cathode, a plate-filament circuit arranged to carry high-frequency oscillations connecting the anode of the valve with the cathode and comprising two earth connections spaced apart, the portion of earth between said connections constituting in effect the receiving or transmitting portion of the system, and a signaling device associated with said plate-filament circuit.

2. Wireless signaling apparatus comprising in combination, an oscillation valve, a source of current connected to the cathode for heating the same, an oscillatory circuit connecting the grid with the cathode, and a plate-filament circuit adapted to carry high-frequency oscillations connecting the anode of the valve with the cathode, which plate-filament circuit is inductively connected to the said oscillatory circuit and comprises two earth connections spaced apart, the portion of earth between said connections constituting in effect the receiving or transmitting portion of the system, and a signaling device associated with said plate-filament circuit.

3. Wireless signaling apparatus comprising in combination, an oscillation valve, a source of current connected to the cathode for heating the same, an oscillatory circuit connecting the grid with the cathode, a second oscillatory circuit which is adapted to carry high-frequency oscillations, is inductively coupled to the first oscillatory circuit and connects the anode of the valve with the cathode, which second oscillatory circuit comprises a source of current, and two earth connections spaced apart, the portion of earth between said connections constituting in effect the receiving or transmitting portion of the system, and a signaling device associated with said plate-filament circuit.

In testimony whereof I affix my signature.

ATHELSTAN ARGYLE HALL.